United States Patent [19]

Kakimi et al.

[11] Patent Number: 4,503,314
[45] Date of Patent: Mar. 5, 1985

[54] METHOD OF WELDING TITANIUM ALLOY PARTS WITH TITANIUM INSERT

[75] Inventors: Tsuneo Kakimi, Tokyo; Megumi Nakanose, Sagamihara; Hiroshi Satoh; Takaharu Konishi, both of Tokyo; Hisanao Kita, Hitachi; Takamitsu Nakazaki, Takahagi, all of Japan

[73] Assignees: Nissan Motor Company, Limited, Yokohama; Hitachi, Ltd., Tokyo, both of Japan

[21] Appl. No.: 371,734

[22] Filed: Apr. 26, 1982

[30] Foreign Application Priority Data

Apr. 30, 1981 [JP] Japan ................................. 56-65577
Apr. 30, 1981 [JP] Japan ................................. 56-65578

[51] Int. Cl.³ ............................................ B23K 15/00
[52] U.S. Cl. ...................... 219/121 ED; 219/137 WM
[58] Field of Search ................ 219/121 EC, 121 ED, 219/106, 137 WM, 137 R

[56] References Cited

U.S. PATENT DOCUMENTS 2,819,383  1/1958  Johnston ............................. 219/118
3,288,481  11/1966  Mabry et al. ................ 219/137 WM
4,156,123  5/1979  Fischer et al. ............... 219/137 R X

FOREIGN PATENT DOCUMENTS 96745  8/1976  Japan ........................... 219/121 ED
12669  4/1977  Japan ........................... 219/121 ED
1389271  4/1975  United Kingdom .

OTHER PUBLICATIONS

M. L. Kohn et al., "Improved Ductility in Titanium Welds", *Metal Progress*, vol. 73, No. 4, pp. 82–86 (Apr. 1957).

D. N. Williams et al., "Hydrogen Segregation in Ti-6 Al-4V Weldments . . . ", *Welding Research Supplement*, vol. 49, No. 5, pp. 207–212.

S. M. Gurevich et al., "The Weldability of Thermally Stable . . . " *Automatic Welding*, vol. 21, No. 4, pp. 6–9 (Apr. 1968).

G. E. Faulkner, "The Effects of Alloying Elements on Welds in Titanium—Part II" *Welding Research Supplement*, vol. 34, No. 6, pp. 295–312 (1955).

W. A. Baeslack, III et al., "A Comparative Evaluation of Laser and . . . " *Welding Journal*, vol. 60, No. 7, pp. 121–130 (Jul. 1981).

*Primary Examiner*—C. L. Albritton
*Attorney, Agent, or Firm*—Schwartz, Jeffery, Schwaab, Mack, Blumenthal & Koch

[57] ABSTRACT

A method of welding opposite end surfaces of two titanium alloy parts kept in alignment by a high energy-density welding process such as electron beam welding, laser beam welding or TIG arc welding, characterized by closely interposing an insert member of either practically pure titanium or Ti-Al binary alloy containing up to 3 Wt % of Al. Owing to thorough alloying of the inserted titanium with the constituents of the fused base metal, the weld metal in a weld joint obtained by this method is sufficiently high in both strength and toughness. By an optional postwelding heat treatment, the strength of the weld metal can further be enhanced.

6 Claims, 3 Drawing Figures

METHOD OF WELDING TITANIUM ALLOY PARTS WITH TITANIUM INSERT

BACKGROUND OF THE INVENTION

This invention relates to a method of welding parts of a titanium alloy fundamentally in the manner of butt welding.

Titanium is a relatively light metal with a specific gravity of 5.54 g/cm$^3$. Because of a relatively high value of specific strength (strength/density) and excellence in heat resistance and corrosion resistance, the use of titanium has been increasing in the area of chemical processing equipment and also in many other areas. Moreover, the addition of certain alloying elements to titanium gives high strength titanium alloys that are very high in specific strength, corrosion resistance and heat resistance and suited to engineering material also in other properties. Accordingly the application of such titanium alloys has been broadening particularly in the aerospace industries. For example, titanium alloys are widely used in the skins of aircraft and the motor cases of rockets.

In manufacturing a structure of a high strength titanium alloy, often there is the need of butt-welding parts of the titanium alloy, and it is prevalent to perform the butt welding in this case by an electron beam welding process. However, the weld metal section (a section brought to molten state during the welding process and solidified again) given by this welding method is liable to become considerably lower in toughness than the base metal, and it is difficult to improve the mechanical properties of this weld metal section by a postwelding heat treatment and sometimes, depending on the type of the titanium alloy, the weld metal section becomes more brittle by heat treatment. It is also conventional to perform butt welding of titanium alloy parts by a so-called TIG arc welding process, which is an inert-gas shielded-arc welding process using a nonconsumable tungsten electrode, by using a commercially pure titanium rod as filler metal. However, the weld metal section given by this welding method is liable to retain a portion of the pure titanium in the unalloyed state and therefore to become considerably lower in strength than the base metal.

SUMMARY OF THE INVENTION

In view of the above described problems in the conventional methods of welding titanium alloy parts, it is an object of the present invention to provide a novel method of welding titanium alloy parts, which method gives a butt weld joint comprising a well alloyed weld metal section, which is free of weld defects and sufficiently high in both strength and toughness, and having good mechanical properties.

The present invention provides a method of welding opposite end surfaces of two titanium alloy parts kept in alignment by a high energy-density welding process, and the principal feature of the invention is to closely interpose an insert member between the end surfaces of the two titanium alloy parts, the material of the insert member consisting essentially of 0-3% by weight of aluminum and the balance of titanium.

In this welding method, the high energy-density welding process is performed so as to fuse the insert member as well as adjacent end surface regions of the two titanium alloy parts.

Electron beam welding, laser beam welding and TIG arc welding can be named as typical examples of high energy-density welding processes useful in the present invention.

The welding method according to the invention is applicable to both alpha type titanium alloys and alpha-beta type titanium alloys, and also to beta type titanium alloys.

In this welding method there occurs thorough alloying of titanium introduced as the insert material with the alloying elements contained in the fused portion of the base metal. Consequentially a butt weld joint given by this welding method has good mechanical properties and is free of weld defects. The well alloyed weld metal in this weld joint is sufficiently high in both strength and toughness.

It is possible to enhance the strength of a weld joint given by this welding method by a suitable postwelding heat treament.

DESCRIPTION OF THE PREFERRED EMBODIMENTS

Figure 1:
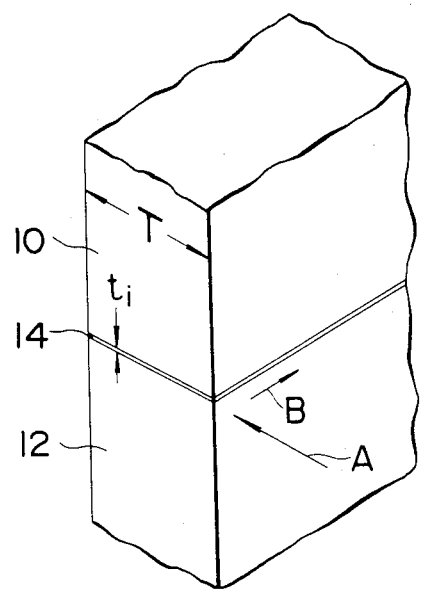
FIG. 1 is a fragmentary and perspective view of an assembly of two titanium alloy parts and an insert sheet to be welded in an example of the welding method according to the invention.

As mentioned above the welding method according to the invention is applicable to every type of titanium alloy. As to alpha type titanium alloys containing relatively large amounts of alpha-stabilizing elements such as aluminum and tin, examples of suitable and commercially available alloys are Ti-5%Al-2.5%Sn, Ti-8%Al-1%Mo-1%V, Ti-5%Al-5%Sn-5%Zr and Ti-7%Al-12%Zr. As to alpha-beta type titanium alloys containing at least one beta-stabilizing element such as vanadium, chromium or molybdenum in addition to an adequate amount of aluminum, Ti-6%Al-4%V and Ti-6%Al-6%V-2%Sn are named as suitable and commercially available examples. As to beta type titanium alloys containing relatively large amounts of beta-stabilizing elements, Ti-13%V-11%Cr-3%Al and Ti-15%Mo-5%Zr are named as commercially available examples.

The material of the insert member characteristic of the welding method according to the invention may be either practically pure titanium or a binary alloy consisting essentially of up to 3% by weight of aluminum and the balance of titanium.

For example, practically pure titanium of Type 1, 2 or 3 according to JIS (Japanese Industrial Standard) H 4650 is useful as the insert material. Titanium of this class may contain less than 0.20% (or 0.40%) of O, less than 0.05% (or 0.07%) of N, less than 0.15% of H and less than 0.20% (or 0.25%, or 0.40%) of Fe. A practically pure titanium insert member of this class can be produced from a titanium ingot obtained by melting sponge titanium either in vacuum or in an inert gas atmosphere in an electric arc furnace of the consumable electrode type or a plasma-beam furnace by a suitable shaping method such as forging, extrusion or rolling.

Alternatively and rather preferably, a titanium insert member is produced through a two-stage fusion process comprising the steps of producing a rod-shaped titanium ingot in a plasma-beam furnace, melting this ingot in vacuum by using the ingot as a consumable electrode, and subjecting the ingot obtained through the second fusion step to a suitable shaping operation.

With a view to minimizing the introduction of impurity elements of the interstitial type that significantly affect the mechanical properties such as strength and toughness of titanium, it is optional to use so-called ELI (extra low interstitial) titanium as the insert material. In ELI titanium the contents of interstitial impurity elements are limited to the extent of less than 0.08% of O, less than 0.01% (or 0.015%) of N and less than 0.02% (or 0.03%) of C.

By using a titanium alloy consisting essentially of up to 3.0% by weight of Al and the balance of Ti as the insert material, it is possible to further enhance the tensile strength and proof stress of the weld metal given by a method according to the invention. The content of aluminum in the insert material is limited to 3.0% in order to ensure that the content of aluminum in the weld metal does not exceed about 6%, which is accepted as the upper limit of aluminum capable of existing in the state of solid solution, to thereby prevent the introduced aluminum from unfavorably affecting the elongation and toughness of the weld metal.

Two titanium alloy parts to be welded together are brought into alignment, and a suitably shaped insert member of pure titanium or titanium-aluminum alloy is closely interposed between oppositely positioned end surfaces of the two titanium alloy parts. The titanium alloy parts to be welded may be either plates or bars or rods. The insert member is usually in the form of plate or sheet. The resultant assembly of the base metal and the insert member is subjected to a high energy-density welding process. In the present invention, practical examples of high energy-density welding processes are electron beam welding that utilizes a concentrated beam of electrons as the source of welding heat, laser beam welding that utilizes a laser light beam as the source of welding heat, plasma arc welding that utilizes a plasma arc as the source of welding heat, and TIG arc welding with a nonconsumable electrode such as a tungsten electrode that utilizes an inert shield gas preferably containing helium and, preferably, is performed with application of a pulse current. Among these high energy-density welding processes, electron beam welding and laser beam welding processes are particularly advantageous because of the possibility of realizing higher energy density compared with arc welding processes, ease of controlling the welding heat and the possibility of enhancing the precision and efficiency of welding.

A primary advantage of a high energy-density welding process typified by electron beam welding resides in that the amount of energy required per unit length of the weld line is very small, so that both a fused zone and adjacent heat-affected zones in this welding process remain relatively small in width. Accordingly, in the weld joint given by this welding method the residual strains and stresses are very small and localized within a very narrow region, and therefore the weld joint exhibits good mechanical properties even in the state as welded followed by no heat treatment. Furthermore, a high energy-density welding process has the effect of producing a molten pool which is under adequate agitation because there occurs a boiling phenomenon in a region irradiated by the beam or arc, whereby there occurs thorough alloying in the fused zone to the effect of preventing any portion of the insert material from remaining unalloyed in the resultant weld metal. This is another reason for good mechanical properties of a weld joint given by a method according to the invention.

As to the welding position in the method according to the invention, both down hand welding by a vertical beam or arc and horizontal welding by a horizontal beam or arc are possible, and in both cases the welding may be performed in the manner of either piercing welding or nonpiercing welding (partial penetration welding). When piercing welding is performed by down hand welding, sometimes it will be difficult to support the molten pool (a region brought to molten state during welding) solely by the surface tension of the penetration bead on the reverse side, depending on the thickness of the titanium alloy parts in the weld zone. In such a case, it will be necessary to use a backing strip so as to produce a partial penetration state to thereby prevent the fall of the molten pool. In the case of horizontal welding the welding operation is less affected by the dead weight of the molten pool than in the case of down hand welding, and horizontal welding is better in the stability of the beam hole and easier to perform piercing welding. Therefore, horizontal welding is more suited to the welding method according to the invention than down hand welding. Horizontal welding is further classified roughly into upwardly travelling welding, downwardly travelling welding, laterally travelling welding and circumferentially travelling welding, and in the present invention a suitable method is chosen with due consideration of the shape and size of the parts to be welded and the welding conditions.

In performing a high energy-density welding process such as electron beam welding in the manner of either piercing welding or nonpiercing welding, excessive increase in the beam output power tends to cause a considerable enlargement of the width of the molten pool and vigorous agitation of the molten pool to possibly result in outflow of some molten metal from the molten pool and, hence, appearance of recesses or other weld defects in the weld metal. Therefore, the rate, angle and direction of swinging of the beam in the welding operation should be controlled considering that these factors affect the degree of movement of the molten metal in the molten pool. Besides, it is desirable to adequately determine the degree of penetration of the beam and the beam current. In some cases, it is preferred to employ a local vacuum welding method so as to maintain only a region in the vicinity of the weld line in vacuum.

When performing the welding method according to the invention by TIG arc welding, it is preferred to perform the TIG arc welding with application of a pulse current because this is effective for further promotion of alloying in the fused zone during welding and, hence, improvement in the mechanical properties of the weld joint.

It will be understood that the welding method according to the invention gives an excellent weld joint when the volume of the insert member is within a suitable range. More particularly, it is preferred that the material of the insert member occupies 5 to 85% of the unit volume of a molten metal section formed during welding operation and, hence occupies 5 to 85% of unit volume of the weld metal section given by the welding. Referring to FIG. 1 by way of example, when insert sheet 14 having a thickness $t_i$ is interposed between edge faces of two pieces 10 and 12 of a titanium alloy plate having a thickness T and the welding is performed such that a resultant weld metal section 16 in FIG. 2 has a thickness $t_w$, it is suitable that the proportion of the thickness $t_i$ of the insert member 14 to the thickness $t_w$ of the weld metal section 16, $t_i/t_w$, ranges from 5 to 85% by percentage. When the proportion of the insert material is less than 5% by volume, the weld metal section is liable to become considerably lower in toughness than the base metal. However, when the proportion of the insert material exceeds 85% by volume, the thickness of the insert member will become greater than the width of the electron beam utilized in the welding operation and the agitation of the melted insert material will remain insufficient. Therefore, the use of such a large quantity of insert material is liable to result in the nonuniformly localized existence of a portion of the insert material in an unalloyed state in the weld metal section as a cause of degradation of the mechanical properties of the weld metal section.

When it is desired to subject a weld joint obtained by the above described welding method to a heat-treatment, a selection can be made from stress and strain relief heat treatment, diffusion heat treatment and a combination of solid solution heat treatment and an aging treatment.

In the case of a stress and strain relief heat treatment, it is suitable to heat the weld joint at a temperature in the range from about 450° C. to about 950° C. for about 15 min to about 15 hr, followed by either air cooling or water quenching.

In the case of a diffusion heat treatment, it is suitable to heat the weld joint at a temperature above 800° C. for about 15 min to about 15 hr, followed by either water quenching or air cooling.

In the case of a combination of solid solution heat treatment and aging treatment, it is suitable to first perform a solid solution heat treatment consisting of heating at a temperature in the range from about 800° C. to about 1000° C. for about 15 min to about 6 hr and subsequent water quenching, oil quenching or air cooling and then perform an aging treatment consisting of heating at a temperature in the range from about 400° C. to about 700° C. for about 15 min to about 15 hr and subsequent air cooling. If desired, the aging treatment may be carried out by repeating relatively short heating several times, and it is also optional to perform a heat treatment including over aging.

As is known, alpha type titanium alloys have the hexagonal structure that is stable at lower temperatures and, hence, are hardly heat-treatable. Accordingly, the above described combination of solid solution heat treatment and the subsequent aging treatment is applicable to alpha-beta type titanium alloys and should be performed so as to appropriately adjust the fine-grain structure of the weld metal in connection with the alpha-to-beta and beta-to-alpha transformations of the employed alloy to thereby achieve improvement and stabilization of the mechanical properties of the weld joint.

The method according to the invention will be illustrated by the following examples.

EXAMPLE 1A

In this example the base metal was a Ti-6Al-4V alloy plate having a thickness T of 40 mm, and an ELI titanium sheet having a thickness $t_i$ of either 0.6 mm or 1.2 mm was employed as the insert material. Tables 1 and 2 show the results of analysis of the titanium alloy plate and the titanium sheet, respectively.

TABLE 1

| Base Metal (Wt %) | | | | | | | |
|---|---|---|---|---|---|---|---|
| Al | V | C | Fe | N | O | H | Ti |
| 6.25 | 4.12 | 0.016 | 0.221 | 0.0021 | 0.145 | 0.0010 | balance |

TABLE 2

| Insert Material (Wt %) | | | | | |
|---|---|---|---|---|---|
| Fe | H | C | O | N | Ti |
| 0.0254 | 0.00239 | 0.0059 | 0.0691 | 0.00841 | balance |

Referring to FIG. 1, two pieces 10 and 12 of the titanium alloy plate were subjected to butt welding by electron beam welding with the titanium sheet 14 closely inserted between the opposite edges of the two pieces 10 and 12 of the titanium alloy plate. The 0.6 mm thick insert 14 and the 1.2 mm thick insert 14 were used individually and alternately. The major surfaces of the assembled workpieces were set vertical, and the direction of the electron beam was made horizontal as indicated by arrow A in FIG. 1 and the electron beam was moved laterally as indicated by arrow B. The electron beam welding equipment was operated so as to accomplish horizontal piercing welding under the following welding conditions.

| Acceleration Voltage | 60 kV |
|---|---|
| Beam Current | 200 μA |
| Welding Speed | 300 mm/min |
| Welding Distance | 300 mm |
| Focus Point of Beam | 50 mm rearward from workpiece surface |

Figure 2:
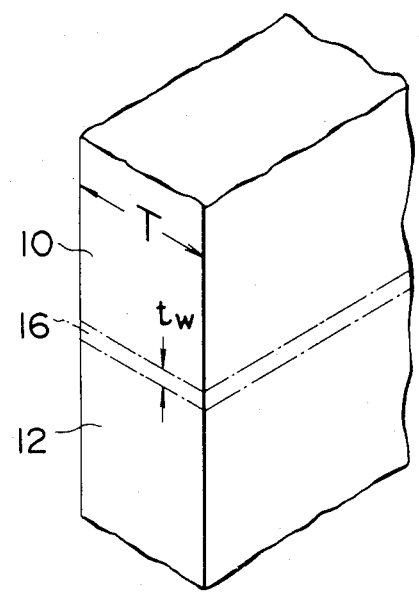
FIG. 2 is a fragmentary and perspective view of a welded body obtained by welding of the assembly of FIG. 1.

In addition, subsidiary factors such as the rate of swinging of the electron beam, angles of the swinging and the directions of the swinging were controlled such that a weld metal section 16 indicated in FIG. 2 after completion of the welding operation was free from weld defects and had a thickness $t_w$ of 4.5 mm.

Figure 3:
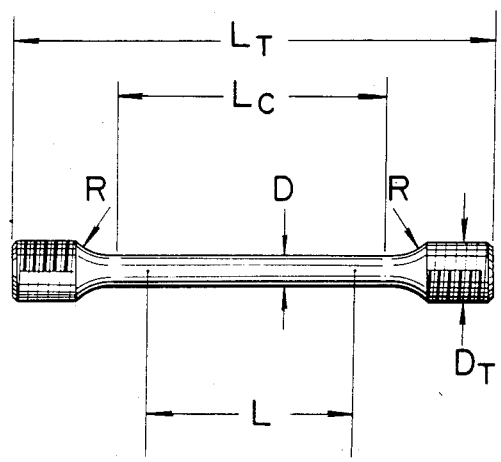
FIG. 3 is a longitudinal elevational view of a test piece for a tensile test performed in examples of the invention to examine mechanical properties of the weld metal.

To examine the mechanical properties of the weld metal section 16 in FIG. 2, test pieces for tensile strength test were cut out of the weld metal section 16 in the state as welded. These test pieces were in the shape as shown in FIG. 3 and all cut out along the weld line. The dimensions of each test piece were as follows.

| Gauge Length L | 35 mm |
|---|---|
| Total Length $L_T$ | 100 mm |
| Length of Straight Cylinder Section $L_C$ | 45 mm |
| Diameter D | 4 ± 0.05 mm |
| Radius of Curvature at Shoulder R | 10 mm |
| Diameter of Threaded Portions $D_T$ | 10 mm |

For reference, the above described electron beam welding operation was performed without using any insert material, and the test pieces were cut out of the resultant weld metal section.

The results of the tensile strength test (in the direction of the weld line) are presented in Table 3.

TABLE 3

Mechanical Properties of Weld Metal Sections in Example 1A

| Insert | Tensile Strength (kgf/mm$^2$) | 0.2% Proof Stress (kgf/mm$^2$) | Elongation (%) |
|---|---|---|---|
| No Insert (Reference) | 97.0 | 87.5 | 7.0 |
| Ti Sheet $t_i = 0.6$ mm | 95.5 | 84.5 | 9.0 |
| Ti Sheet $t_i = 1.2$ mm | 88.5 | 77.0 | 11.0 |

As can be seen in Table 3, in the case of the reference welding operation wherein the titanium alloy parts were in direct abutment with no insert material therebetween, the weld metal section was insufficient in the elongation value and, hence, in toughness. In contrast, the weld metal section obtained in each welding operation according to the invention was excellent in the elongation value and satisfactory in tensile strength and 0.2% proof stress values and, therefore, outranked the product of the reference in total evaluation of the mechanical properties.

With respect to the welded sample obtained by using the 0.6 mm thick insert 14, the distribution of chemical composition of the weld metal section 16 in the state as welded was analyzed by means of an X-ray microanalyser at equal intervals in the direction of the thickness $t_w$ (=4.5 mm) in FIG. 2. The result of the analysis is presented in Table 4.

TABLE 4

Distribution of Chemical Composition in Weld Zone in Example 1A (Wt %)

| | Al | V | Fe | Cu | Si | O | Ti |
|---|---|---|---|---|---|---|---|
| Base Metal 10 | 6.290 | 4.567 | 0.300 | 0.002 | 0.441 | 0.300 | 88.100 |
| | 6.327 | 4.389 | 0.283 | 0.007 | 0.018 | 0.300 | 88.677 |
| Weld Metal Section 16 | 4.326 | 3.055 | 0.242 | 0.001 | 0.027 | 0.300 | 92.048 |
| | 4.729 | 3.269 | 0.238 | — | 0.013 | 0.300 | 91.452 |
| | 4.790 | 3.256 | 0.214 | 0.001 | 0.011 | 0.300 | 91.427 |
| | 5.438 | 3.658 | 0.242 | — | 0.014 | 0.300 | 90.347 |
| | 5.513 | 3.749 | 0.244 | 0.012 | 0.012 | 0.300 | 90.170 |
| | 5.456 | 3.754 | 0.236 | 0.012 | 0.022 | 0.300 | 90.220 |
| | 5.459 | 3.910 | 0.265 | 0.000 | 0.037 | 0.300 | 90.030 |
| | 5.537 | 3.748 | 0.256 | 0.014 | 0.054 | 0.300 | 90.091 |
| Base Metal 12 | 6.388 | 4.370 | 0.293 | 0.005 | 0.025 | 0.300 | 88.619 |
| | 6.294 | 4.455 | 0.317 | — | 0.026 | 0.300 | 88.607 |

The analytical data in Table 4 indicate the absence of unalloyed titanium in the weld metal section 16 and the occurrence of uniform and thorough alloying in this section during the welding operation. It is presumed that the excellent alloying was largely attributable to adequate agitation of the molten metal by the impingement of the electron beam.

EXAMPLE 1B

This example relates to a heat treatment subsequent to the electron beam welding operation of Example 1A. No modifications were made to the base metal, insert material, welding method and welding conditions described in Example 1A.

From each of the three kinds of welded bodies obtained respectively by using the 0.6 mm thick insert, 1.2 mm thick insert and no insert, a sample in the shape of a rectangular plate 12.5 mm in width, 300 mm in length and 5 mm in thickness was cut out with the weld metal section 16 in the middle of the sample plate. Each sample plate was subjected first to a solid solution heat treatment consisting of heating at 933° C. for 30 min and subsequent water quenching and next to an aging treatment consisting of heating at 545° C. for 6 hr and subsequent air cooling. After the heat treatment the test pieces shown in FIG. 3 and described in Example 1A were cut out of the respective sample plates and subjected to the tensile strength test. Table 5 shows the results of the test. For comparison, the data obtained in Example 1A without the heat treatment are shown in parenthesis in Table 5.

TABLE 5

Mechanical Properties of Weld Metal Sections after Heat Treatment in Example 1B

| Insert | Tensile Strength (kgf/mm$^2$) | 0.2% Proof Stress (kgf/mm$^2$) | Elongation (%) |
|---|---|---|---|
| No Insert (Reference) | 115.7 (97.0) | 106.0 (87.5) | 5.1 (7.0) |
| Ti Sheet $t_i = 0.6$ mm | 116.0 (95.5) | 105.5 (84.5) | 8.0 (9.0) |
| Ti Sheet $t_i = 1.2$ mm | 98.4 (88.5) | 89.5 (77.0) | 9.4 (11.0) |

As can be seen in Table 5, the heat treatment of Example 1B had the effect of considerably enhancing the strength of the weld metal section with some decrease in the elongation. Also it can be seen that the use of the titanium insert in the butt welding resulted in noticeable improvement in the toughness of the weld metal section after the heat treatment.

EXAMPLE 1C

This example too relates to a heat treatment subsequent to the welding operation of Example 1A.

Using the 40 mm thick titanium alloy plate and the 0.6 mm thick titanium sheet described in Example 1A, the electron beam welding operation of Example 1A was performed by the same method under the same conditions. Then, a sample in the shape of the rectangular plate mentioned in Example 1B was cut out of the welded body with the weld metal section in the middle of the sample plate, and the sample plate was subjected to a diffusion treatment consisting of heating at 948° C. for 10 hr and subsequent water quenching. After that, the distribution of chemical composition of the weld metal section in the sample plate was analyzed by means of an X-ray microanalyser at equal intervals in the direction of the thickness $t_w$ in FIG. 2. The result of the analysis is presented in Table 6.

TABLE 6

Distribution of Chemical Composition in Weld Zone in Example 1C after Heat Treatment (Wt %)

| | Al | V | Fe | Cu | Si | O | Ti |
|---|---|---|---|---|---|---|---|
| Base Metal 10 | 6.240 | 3.764 | 0.252 | 0.003 | 0.016 | 0.300 | 89.425 |
| | 6.016 | 6.562 | 0.713 | 0.002 | 0.069 | 0.300 | 86.337 |
| Weld Metal Section 16 | 4.189 | 1.486 | 0.029 | — | 0.004 | 0.300 | 93.992 |
| | 3.414 | 3.416 | 0.335 | — | 0.006 | 0.300 | 92.529 |
| | 4.020 | 1.779 | 0.082 | — | 0.003 | 0.300 | 93.816 |
| | 5.171 | 1.746 | 0.035 | — | 0.004 | 0.300 | 92.744 |
| | 4.881 | 2.559 | 0.138 | — | 0.005 | 0.300 | 92.116 |
| | 4.929 | 2.745 | 0.172 | 0.002 | 0.006 | 0.300 | 91.846 |
| | 4.325 | 5.163 | 0.560 | — | 0.016 | 0.300 | 89.635 |
| | 4.577 | 4.143 | 0.397 | — | 0.012 | 0.300 | 90.571 |
| | 4.732 | 3.751 | 0.329 | 0.001 | 0.017 | 0.300 | 90.870 |
| Base Metal 12 | 6.529 | 3.161 | 0.135 | — | 0.013 | 0.300 | 89.862 |
| | 6.296 | 3.973 | 0.270 | — | 0.013 | 0.300 | 89.148 |

The analytical data in Table 6 indicate the achievement of thorough alloying in the weld metal section 16 during the welding without leaving any portion of the inserted titanium unalloyed.

EXAMPLE 2A

In this example the base metal was the 40 mm thick plate of the Ti-6Al-4V alloy described in Example 1A, and a Ti-1.5Al alloy sheet having a thickness $t_i$ of either 0.6 mm or 1.2 mm was employed as the insert material. Table 7 shows the result of analysis of the Ti-1.5Al alloy sheet.

TABLE 7

| Insert Material (Wt %) | | | | | | |
|---|---|---|---|---|---|---|
| Al | Fe | H | C | O | N | Ti |
| 1.5 | 0.18 | 0.0030 | 0.0080 | 0.20 | 0.00820 | balance |

Using these materials, the electron beam welding operation described in Example 1A was performed with no modifications to the welding method and welding conditions. For reference, the same welding operation was performed without using any insert material. The test pieces shown in FIG. 3 and described in Example 1A were cut of the weld metal section 16 of every welded body (as-welded) obtained in this example and subjected to the tensile test to examine the mechanical properties of the weld metal section in the direction of the weld line. The results of the test are shown in Table 8.

TABLE 8

Mechanical Properties of Weld Metal Sections in Example 2A

| Insert | Tensile Strength (kgf/mm²) | 0.2% Proof Stress (kgf/mm²) | Elongation (%) |
|---|---|---|---|
| No Insert (Reference) | 97.0 | 87.5 | 7.5 |
| Ti Alloy Sheet $t_i$ = 0.6 mm | 97.5 | 86.0 | 8.0 |
| Ti Alloy Sheet $t_i$ = 1.2 mm | 91.5 | 80.0 | 10.0 |

Compared with the data in Table 3, the data in Table 8 show that the change in the insert material from practically pure titanium to the titanium-aluminum alloy produced some increase in the strength of the weld metal section 16 accompanied by some decrease in the elongation. In the case of using a titanium-aluminum alloy as the insert material in a practical welding operation according to the invention, it is recommended to determine the content of aluminum in the insert so as not to significantly lower the elongation of the weld metal by experimentally confirming the dependence of the elongation on the aluminum content in advance.

With respect to the welded body obtained by using the 0.6 mm thick insert 14, the distribution of chemical composition of the weld metal section 16 in the state as welded was analyzed by means of an X-ray microanalyser at equal intervals in the direction of the thickness $t_w$ (=4.5 mm) in FIG. 2. The result of the analysis is presented in Table 9.

TABLE 9

Distribution of Chemical Composition in Weld Zone in Example 2A

| | Al | V | Fe | Si | O | Ti |
|---|---|---|---|---|---|---|
| Base Metal 10 | 6.912 | 3.755 | 0.181 | 0.012 | 0.250 | 89.194 |
| Weld Metal Section 16 | 7.155 | 3.294 | 0.147 | 0.041 | 0.250 | 90.132 |
| | 6.391 | 4.975 | 0.333 | 0.000 | 0.250 | 89.067 |
| | 6.653 | 4.310 | 0.263 | 0.000 | 0.250 | 89.507 |
| | 6.077 | 5.964 | 0.504 | 0.000 | 0.250 | 87.936 |
| | 6.608 | 4.477 | 0.278 | 0.009 | 0.250 | 89.156 |
| | 7.117 | 3.160 | 0.126 | 0.013 | 0.250 | 89.968 |
| | 7.200 | 3.125 | 0.110 | 0.011 | 0.250 | 90.160 |
| | 6.834 | 3.545 | 0.146 | 0.000 | 0.250 | 89.614 |
| | 7.297 | 2.822 | 0.097 | 0.030 | 0.250 | 90.437 |
| Base Metal 12 | 7.079 | 3.404 | 0.200 | 0.000 | 0.250 | 89.689 |
| | 7.827 | 3.306 | 0.132 | 0.045 | 0.250 | 90.071 |

The analytical data in Table 9 indicate the achievement of thorough alloying in the weld metal section 16 during the welding.

EXAMPLE 2B

This example relates to a heat treatment subsequent to the electron beam welding operation of Example 2A. No modifications were made to the base metal, insert material, welding method and welding conditions described in Example 2A. From each of the three kinds of welded bodies obtained respectively by using the 0.6 mm thick insert, 1.2 mm thick insert and no insert, a sample in the shape of the rectangular plate described in Example 1B was cut out with the weld metal section 16 in the middle of the sample plate. In accordance with Example 1B, each sample sample plate was subjected first to the solid solution heat treatment (heating at 933° C. for 30 min and subsequent water quenching) and, next to the aging treatment (heating at 545° C. for 6 hr and subsequent air cooling).

After the heat treatment the test pieces shown in FIG. 3 and described in Example 1A were cut out of the respective sample plates and subjected to the tensile test. Table 10 shows the results of the test. For comparison, the data obtained in Example 2A without the heat treatment are shown in parenthesis in Table 10.

TABLE 10

Mechanical Properties of Weld Metal Sections after Heat Treatment in Example 2B

| Insert | Tensile Strength (kgf/mm²) | 0.2% Proof Stress (kgf/mm²) | Elongation (%) |
|---|---|---|---|
| No Insert (Reference) | 115.7 (97.0) | 106.0 (87.5) | 5.1 (7.0) |
| Ti-1.5Al Sheet $t_i$ = 0.6 mm | 116.0 (95.5) | 106.0 (84.5) | 8.0 (9.0) |
| Ti-1.5Al Sheet $t_i$ = 1.2 mm | 98.4 (88.5) | 89.5 (77.5) | 9.4 (11.5) |

As can be seen in Table 10, the heat treatment of Example 2B had the effect of considerably enhancing the strength of the weld metal section with some decrease in the elongation. Also it can be seen that the use of the titanium-aluminum alloy insert in the butt welding resulted in noticeable improvement in the toughness of the weld metal section after the heat treatment.

EXAMPLE 3A

In this example, a 2.5 mm thick plate of Ti-6Al-4V alloy of the composition shown in Table 1 was employed as the base metal, and a 0.5 mm thick sheet of ELI titanium of the composition shown in Table 2 was used as the insert material.

In the manner as shown in FIG. 1, the titanium sheet 14 was inserted between the opposite edges of two pieces 10 and 12 of the titanium alloy plate. This assembly was subjected to TIG arc welding with application of a pulse current under the following welding conditions. The welding operation was performed such that the thickness $t_w$ of the weld metal section 16 in FIG. 2 became 5.5 mm.

| | |
|---|---|
| Current | 120 A |
| Voltage | 9.5 V |
| Welding Speed | 120 mm/min |
| Working Gas | Ar + 50% He |
| Shield Gas | Ar |
| Shield Gas Flow Rate | 10 l/min |
| Pulse Frequency | 1 KHz |

The test pieces shown in FIG. 3 were cut out of the weld metal section 16 of the welded body (as-welded) along the direction of the weld line and subjected to the tensile test. The data obtained in this test indicated that the welded metal was satisfactory in both strength and toughness. The distribution of chemical composition of the weld metal section 16 was analyzed by means of an X-ray microanalyser at equal intervals in the direction of the thickness $t_w$ in FIG. 2. From the result of the analysis the weld metal section was confirmed to have a thoroughly dispersed and alloyed structure.

EXAMPLE 3B

This example relates to a heat treatment subsequent to the pulsed TIG arc welding operation of Example 3A. No modifications were made to the base metal, insert material, welding method and welding conditions described in Example 3A.

The welded body was subjected first to a solid solution heat treatment consisting of heating in a vacuum furnace maintained at 933° C. for 20 min and subsequent oil quenching and next to an aging treatment consisting of heating at 545° C. for 5 hr and subsequent air cooling. After the heat treatment, the mechanical properties of the weld metal section 16 and the distribution of chemical composition in the direction of the thickness $t_w$ of the weld metal section were examined in accordance with Example 3A. Also in this example, it was confirmed that the weld metal section was satisfactory in both strength and toughness and had a thoroughly dispersed and alloyed structure.

What is claimed is:

1. In a method of welding opposite end surfaces of two aligned alpha-beta type titanium alloy parts by an electron beam welding, the improvement comprising closely interposing an insert member between said end surfaces of the two titanium alloy parts, the material of said insert member consisting essentially of 0-3% by weight of aluminum and the balance of titanium, and subjecting a weld joint obtained by the electron beam welding operation to a postwelding heat treatment which is a combination of a solid solution treatment comprising the substeps of heating said weld joint at a temperature in the range from about 800 degrees C. to about 1000 degrees C. and quenching the heated weld joint in a liquid, and a subsequent aging treatment comprising the substeps of heating the weld joint at a temperature in the range from about 400 degrees C. to about 680 degrees C. and cooling the heated weld joint.

2. A method according to claim 1, wherein said alpha-beta type titanium alloy is selected from the group consisting of Ti-6%Al-4%V alloy and Ti-6%Al-6%V-2%Sn alloy.

3. A method according to claim 1, wherein said insert member is in the form of plate.

4. A method according to claim 3, wherein each of said titanium alloy parts is in the form of plate.

5. A method according to claim 3, wherein each of said titanium alloy parts is in the form of rod.

6. A method according to claim 3, wherein each of said titanium alloy parts is in the form of bar.

* * * * *